April 6, 1965 C. A. IRAZOQUI 3,176,927

REPEATER MECHANISM FOR TAPE RECORDERS

Filed March 20, 1962 3 Sheets-Sheet 1

INVENTOR.
Carlos A. Irazoqui
BY
Bacon & Thomas
ATTORNEYS

START

ROTATED 60°

ROTATED 120°

ROTATED 180°

INVENTOR.
Carlos A. Irazoqui
BY
Bacon & Thomas
ATTORNEYS

April 6, 1965 C. A. IRAZOQUI 3,176,927

REPEATER MECHANISM FOR TAPE RECORDERS

Filed March 20, 1962 3 Sheets-Sheet 3

INVENTOR.
Carlos A. Irazoqui
BY
Bacon & Thomas
ATTORNEYS

United States Patent Office 3,176,927

Patented Apr. 6, 1965

3,176,927

REPEATER MECHANISM FOR TAPE RECORDERS

Carlos A. Irazoqui, New York, N.Y., assignor to Electro-Mechanical Consultants, Inc., New York, N.Y., a corporation of New York Filed Mar. 20, 1962, Ser. No. 181,068
11 Claims. (Cl. 242—55.12)

This invention relates to an instruction device for use in teaching the reading of Braille or in the teaching of languages or the like to either blind or normal persons.

In general, the invention comprises a playback and recording mechanism upon which a filament or film of material having information recorded thereon may be employed and in which a predetermined portion of the filament, tape or film may be repeatedly passed back and forth across recording and/or playback heads to reproduce the recorded information, to record the student's responses or attempts to reproduce the initially recorded material and to play back either or both as often as desired, while at the same time holding another portion of the filament, tape or film stationary in a position tactually exposed to the operator and constituting a fixed reference identifying and corresponding to the recorded material being repeated. The invention also includes a novel loop-forming and take-up means for the film, tape or filament comprising a rotary table having concentric circular rows or idler rollers thereon and a stationary member having a circle of idler rollers thereon positioned between the concentric rows on the rotary table. The tape or filament is threaded diametrically across the table and when the latter is rotated to move the concentric rows of rollers, they engage the tape or filament and partially wrap the same around the fixed rollers to thus accumulate an appreciable length of tape thereon.

Throughout this description, the term "tactual" is employed to define that characteristic of certain recorded information whereby it can be read or interpreted by the operator by either his or her sense of feel or by sight. Thus, it may include optically projected visual information, printed material or Braille characters.

It is, therefore, an object of this invention to provide an improved instruction device for using recorded material adapted to be repeatedly played back by the operator and have the operator or student's version thereof also recorded thereon while exposing, in a fixed position, information corresponding to that being played back and/or recorded.

Another object of the invention is to provide an instruction device as set forth above, including a novel loop-forming or take-up and releasing mechanism for a film, tape or filament.

Still another object of the invention is to provide an instruction device as described, including clamp means for holding the major portion of such a filament, tape or film against movement, while permitting repeated reproduction of a portion thereof between said clamp means.

A further object of the invention is to provide a device of the type set forth in which a protective cover encloses substantially all of the operating mechanism except a portion of a tape or the like which is conveniently and tactually exposed to an operator.

A still further object is to provide an instruction device as set forth which is relatively simple and economical to produce and yet highly efficient and reliable in operation.

Additional and further objects and advantages will become apparent to those skilled in the art as the description proceeds with reference to the accompanying drawings, wherein.

Figure 1:
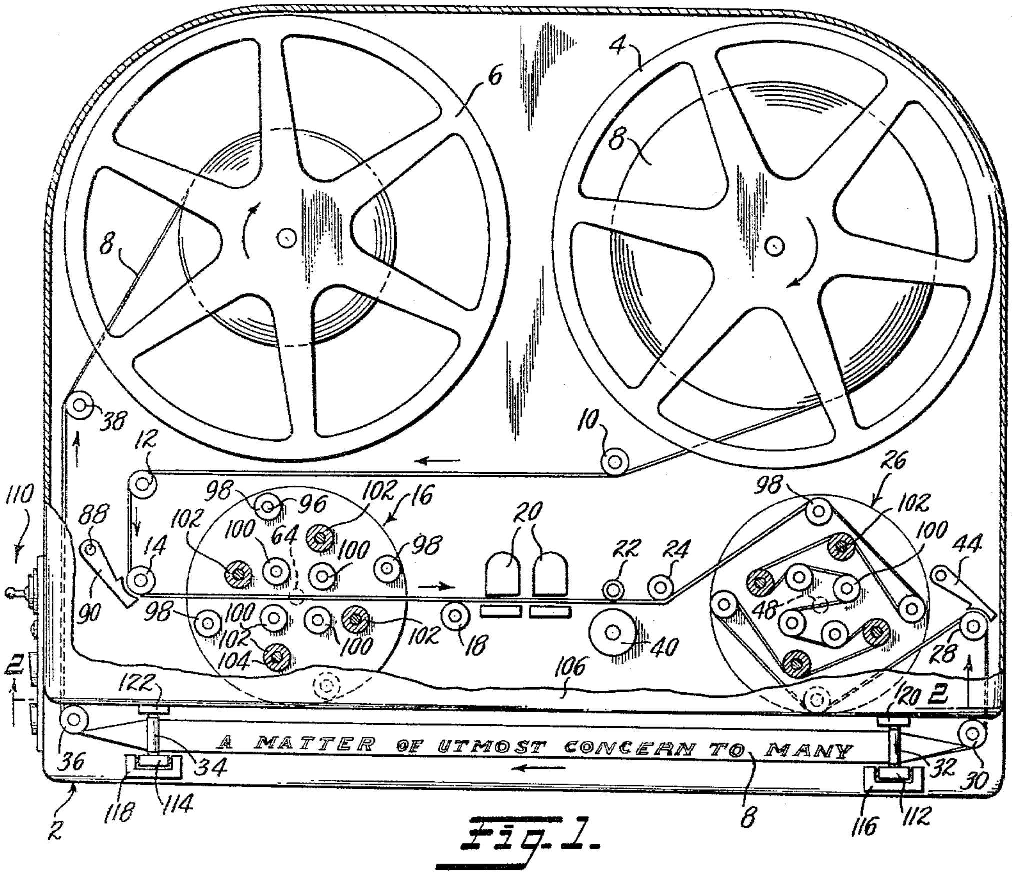
FIG. 1 is a top plan view, with most of the cover broken away, of an apparatus embodying the present invention.

For purposes of illustration, but not of limitation, a preferred form of the invention will be described herein as a tape recording and playing machine although it is to be understood that the invention is not limited to magnetic tape but may be applied with equal facility to optical film and other equivalent media, as will be apparent to those skilled in the art.

The tape recorder and player comprising the illustrative embodiment consists of a suitable housing 2 which contains conventional operating and electronic equipment for recording on and/or playing magnetic tape. As shown, the apparatus comprises a supply reel 4 and a take-up reel 6 for a supply of magnetic tape. The supply of magnetic tape 8 on supply reel 4 is threaded through the machine by training the same over guide rollers 10, 12 and 14, substantially diametrically across a rotary loop-forming or take-up device 16, past guide roller 18 and erase and playback recording heads 20, then past a capstan roller 22 and guide roller 24 across a second loop-forming or take-up device 26 and guide rollers 28 and 30. All of the guide rollers previously referred to are arranged to rotate on vertical axes. As the tape leaves guide roller 30, however, it is trained under a horizontal roller 32 and thence across the front of the machine adjacent the top surface of housing 2 and under a second horizontal guide roller 34 from whence it is again guided into a vertical plane around guide rollers 36 and 38 to take-up reel 6. As is conventional, the supply reel 4 is mounted so that the tape may be withdrawn therefrom at will and at any desired speed and take-up reel 6 is constantly biased in a direction to seek to constantly wind the tape 8 thereon.

Figure 3:
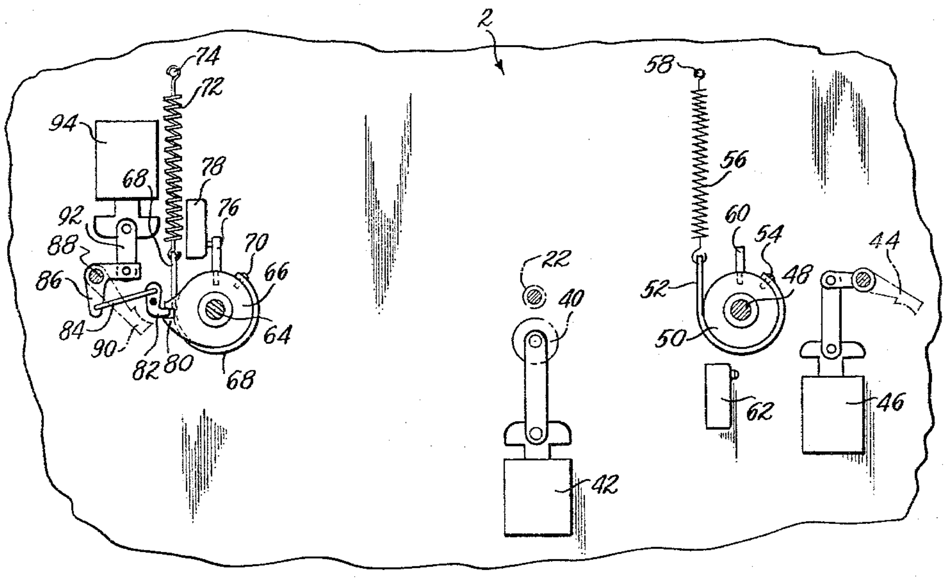
FIG. 3 is a fragmentary horizontal sectional view, with parts schematically shown, taken substantially along the line 3—3 of FIG. 2 and showing only certain portions of the mechanism.
Figure 4:
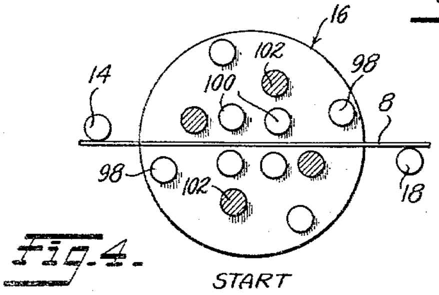
FIGS. 4, 5, 6 and 7 are similar views showing the take-up means in successive stages of operation.
Figure 5:
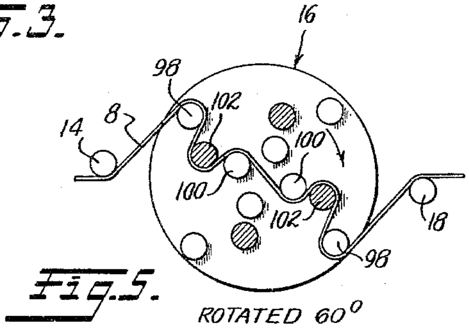
Figure 6:
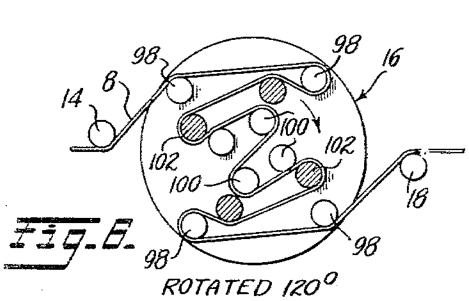

A pressure roller 40 is movably mounted adjacent the capstan roller 22 and is operated by a solenoid 42 (see also FIG. 3). When the solenoid 42 is deenergized, the roller 40 is withdrawn from capstan 22 and when the solenoid is energized, the rollers 40 is pushed toward capstan 22 to clamp the tape 8 therebetween. Capstan 22 is driven in any conventional manner to draw the tape 8 past the heads 20 at a uniform speed in the direction indicated by the arrows in FIG. 1.

A brake or clamp 44 is pivotally mounted on the casing 2 adjacent guide roller 28 and may be operated by solenoid 46 (FIG. 3) to swing the same toward roller 28 and thereby securely clamp the tape 8 against the roller and against movement at that point.

The rotary table 26 is carried by a vertical shaft 48 which has a drum 50 (FIG. 3) fixed thereon. A flexible strap 52 is fixed at one end to the periphery of the drum 50, as at 54 and is trained therearound and its other end is secured to a relatively weak tension spring 56, the other end of which is fixed to the housing 2 at 58. It will thus be seen that the spring 56 constantly urges the table 26 to rotate in a clockwise direction, for a purpose to be described later.

The drum 50 also has a radial projection 60 thereon which, when the shaft 48 is rotated clockwise through approximately 180°, engages and closes a switch 62, for a purpose to be described later.

The rotary table 16 is carried by a vertical shaft 64, which also has a drum 66 fixed thereon and about which a flexible strap 68 is trained, having one end thereof fixed to the drum at 70 and the other end fixed to a relatively strong tension spring 72. The tension spring 72 has its opposite end fixed to the casing 2 at 74. The drum 66 is provided with a radial projection 76 engaging a switch 78 when the table 16 is rotated counter-clockwise to the limit of its movement. In this condition, spring 72 is tensioned and constantly urges the table 16 to rotate clockwise through at least 180°.

The drum 66 is also provided with an abutment 80 engageable by a pivotal latch 82 to hold the drum and shaft 64 in the illustrated position against the action of spring 72. The latch 82 is pivotally mounted on the casing 2 and is operable by a link 84 connected to a bell crank 86 carried by a shaft 88. The shaft 88 also has a brake or clamp 90 fixed thereon above the top of casing 2 and so positioned that when swung counter-clockwise, the brake 90 engages tape 8 and guide roller 14 to clamp the tape against movement at that point. The bell crank 86 is connected through link 92 to the armature of a solenoid 94. It is obvious that energization of the solenoid 94 to swing brake 90 into clamping relation with the roller 14 will also swing latch 82 in a direction to release the drum 66 to the action of spring 72 and thus permit that spring to rotate table 16 in a clockwise direction. It is to be noted at this point that the tension spring 72 is considerably stronger than the tension spring 56, for a reason to be described later.

The rotary tables 16 and 26 are identical in structure and operation and only one will be described in detail, with particular reference to FIG. 1 and FIGS. 4 through 7. Each table is provided with upstanding flanged guide rollers thereon arranged in two circular rows. Each guide roller is rotatably supported on a stub shaft or spindle 96. An outer circular row comprises rollers 98 and an inner circular row, concentric to the outer circular row, comprises rollers 100. It will be obvious that rotary motion of table 16 will carry the rollers 98 and 100 therewith along a circular path.

Radially intermediate the circular rows of rollers 98 and 100 is a third circular row of rollers 102 (shown in section in FIG. 1), each of which is rotatably mounted on a stationary stub shaft or spindle 104. The spindles 104 are fixedly mounted on a movable cover 106 (see FIG. 2), which is preferably hingedly mounted at the rear of casing 2, so that it may be swung upwardly to swing the rollers 102 away from tables 16 and 26 and to expose the mechanism illustrated in FIG. 1. When the cover 106 is in the closed position, it covers all of the mechanism shown and described with the exception of the guide rollers 30 and 36 and the horizontal rollers 32 and 34, thereby leaving the portion of the tape 8 between those horizontal rollers exposed to the view and/or touch of the student or operator.

Figure 7:
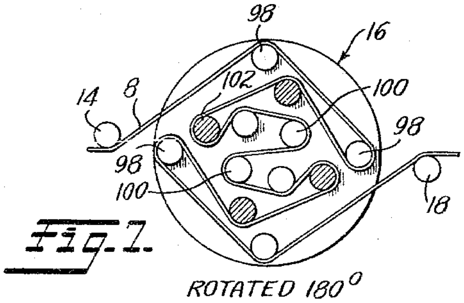

With the cover 106 opened and the table 16 in the position shown and no tape in the machine, the table 26 will normally be held by its spring 56 at the clockwise extreme of its rotary movement in which position the rollers thereon are positioned as shown in FIG. 7. However, it may be manually rotated to the position of FIG. 4. With the parts in this condition, the tape 8 may be threaded around the idler and guide rollers described to extend diametrically across each of the rotary tables between the rollers thereon and free of interference from those rollers.

By referring now to FIGS. 4 through 7, it will be seen that the tape 8 initially extends diametrically across the table 16, for example, and between the rollers thereon. If the table 16 is now permitted to rotate clockwise to the position of FIG. 5, it will be apparent that the rollers 98 and 100, which are adjacent the tape in FIG. 4, will engage that tape and carry spaced portions thereof past opposite sides of each of the adjacent fixed rollers 102. As rotation of the table 16 progresses from the position shown in FIG. 5 to that shown in FIGS. 6 and 7, the tape 8 is looped about the fixed and movable rollers in the manner obviously apparent from the drawings to thereby accumulate a very substantial length of tape on the take-up mechanism comprising the table 16 (or 26). The apparatus is also provided with an interlock switch 108 (see FIG. 8) that is held closed by the cover 106 when the cover is in its closed position but which opens when the cover 106 is lifted. In addition, the apparatus is provided with a panel of manually operable switches, indicated generally at 110 in FIG. 1 at one side of the machine. The operation and purpose for these will be described in further detail hereafter. Also at 110 are conventional selector buttons (not shown) whereby the operator may either reproduce a recording or actually record on the tape, or both.

Figure 2:
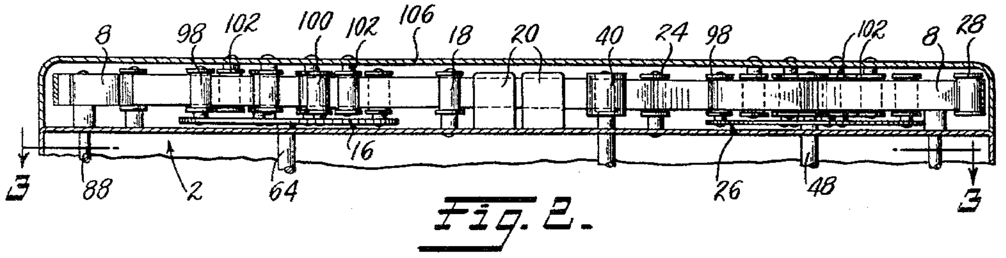
FIG. 2 is a fragmentary vertical sectional view taken substantially along the line 2—2 of FIG. 1.

From the foregoing description, it is apparent that when the machine is threaded with tape as shown in FIG. 1, with the brakes 90 and 44 released, the capstan 22 may be operated to draw tape from the supply reel 4 and permit the take-up reel 6 to take the tape up at the same rate. As previously stated, the take-up reel 6 is constantly biased in a clockwise direction to reel the tape 8 thereon. The means for biasing the take-up reel 6 are stronger than the tension spring 56, tending to rotate table 26 so that even though the table 26 is urged to rotate and to loop tape thereon the take-up reel 6 can overpower that tendency and create enough tension in the tape 8 to prevent rotation of table 26. After threading the starting end of a tape through the machine in the manner described, the tape is driven by capstan 22 (by energizing solenoid 42) until the desired bit of recorded information tactually appears along the forward portion of the machine between the rollers 32 and 34. At that point the tape has reached such position that information recorded thereon, corresponding to that appearing at the front of the machine, is just approaching the recording and playback heads 20. At this point the machine is operated to engage brake 44 with roller 28 to thereby prevent take-up reel 6 from drawing any more tape thereto and insuring that the tactually exposed portion of tape remains stationary and available to the operator. Continued operation of the capstan 22 draws the tape past the heads 20 and the machine reproduces the recorded information corresponding to that at the front of the machine. During this interval of time the table 26 can rotate in the manner described with reference to FIGS. 4 and 7 to take up or loop the predetermined length of tape thereon. That length of tape corresponds to that required to record the information tactually appearing at the front of the machine. After the sentence or other quantity of information is reproduced, the solenoid 94 may be operated to engage brake 90 and thus prevent withdrawal of any more tape from supply reel 4 and at the same time swing latch 82 to release table 16 to spring 72. Since the spring 72 is more powerful than spring 56 and with both brakes 44 and 90 engaged, the roller 40 is now withdrawn from the capstan 22 and spring 72 thus rapidly rotates table 16 in a clockwise direction to accumulate thereon the tape that had been accumulated on table 26. In other words, all of the tape bearing the recorded information corresponding to that tactually exposed is drawn rearwardly and temporarily accumulated and stored ahead of the recording and playback heads 20. If the roller 40 is now again engaged with capstan 22, the latter draws the tape from table 16, rotating the same in a counter-clockwise direction and permits that tape to accumulate on table 26. Obviously the capstan 22 can overpower the spring 72.

The above described cycling can be repeated as many times as the operator wishes for the purpose of reproducing and studying the recorded information, for recording the student's version of the lesson, on the tape, on a channel adjacent the initially recorded material and to play back either recording, or both, at will. During these repeated re-cyclings of that predetermined length of tape, the portion between rollers 32 and 34 is stationary, constantly exposed to the student, and presents the same information being studied through the recording.

It is to be noted that the tape 8 is so trained through the machine and past the heads 20 that one particular face of the tape is presented to the heads 20 and it is so trained past the rollers 32 and 34 that the opposite face of the tape is exposed upwardly. Thus, the face of the tape opposite that containing the magnetically recorded information may be provided with printing, braille characters, or other form of tactual information.

The method of threading tape through the machine has been briefly described but it is to be further noted that for purposes of such threading the loop forming table 16 may have to be manually rotated to the limit of its counter-clockwise movement to the position shown in FIG. 3 wherein the latch 82 engages the abutment 80 to prevent return rotation of the table 16 by spring 72. In like manner, the table 26 must be rotated manually to the counter-clockwise limit of its movement so that it is also in the "straight through" position corresponding to that of table 16 in FIG. 1. To further assist in threading the tape, the rollers 32 and 34 are journalled on stub shafts (not identified) carried by pivot blocks 112 and 114, pivotally mounted in brackets 116 and 118. The opposite ends of the rollers 34, or the shafts on which they are mounted, are releasably latched in blocks 120 and 122 by latch means which are not shown but which may be of any conventional form. Thus, to thread the machine, the rollers 32 and 34 may be swung upwardly so that it is not necessary to actually thread the tape therebelow but to merely pass it from roller 30 to 36 and it can thereafter be turned down and the horizontal rollers latched in place.

Figure 8:
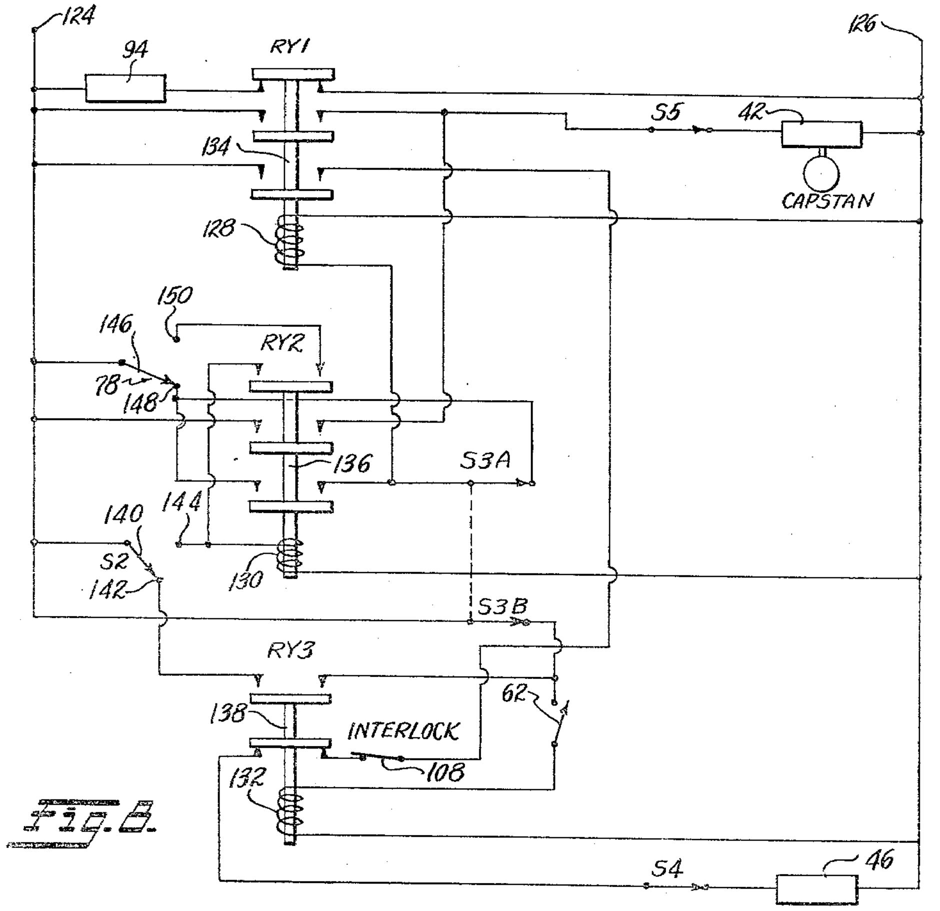
FIG. 8 is a schematic circuit diagram of the control circuits for an apparatus embodying the present invention.

FIG. 8 is a schematic wiring diagram for the described apparatus and controls therefor. Numerals 124 and 126 indicate terminals to be connected to a source of electrical energy for the apparatus. RY1, RY2, and RY3 represent first, second and third relays having relay coils 128, 130, and 132, respectively, and armatures 134, 136 and 138. When the relay coils are deenergized, the armatures assume the lower position shown in FIG. 8 whereas when the coils are energized, the armatures are caused to move upwardly to interconnect the contacts thereabove or to disconnect any contacts therebelow, as will be obvious. S2 is one of the manually operable switches at 110 and comprises a switch blade 140 selectively movable to connect one side of the line to either contact 142 or 144. S3A and S3B are normally closed manually operable switches which are "ganged" together for simultaneous operation. S4 and S5 are additional manually operable but normally closed switches, the operation of which will be further described. The solenoids 42, 46 and 94, previously identified, are shown in their position in the circuits. Switch 62, previously described, is normally open and is closed by rotation of table 26 to the limit of its clockwise movement. Switch 78 likewise comprises a movable switch blade 146 engageable with either contact 148 or 150. The blade 146, however, is normally biased to engage the contact 150 but is held in engagement with contact 148 by the projection 76 on drum 66 when the table 16 is in the straight through position shown in FIG. 1.

After the tape 8 has been threaded through the machine, the first sentence may be loaded into the repeater mechanism. The loop forming mechanisms 16 and 26 are both in the "straight through" positions, switch 78 is in the position shown and S2 is then operated. RY1 is energized through 78, S3A, and RY2 is energized through S2, solenoid 94 is deenergized. Brake 90 is thus released and brake 44 is normally energized. S4 is a "non-repeat option" switch and has to be opened for the loading operation. This will deenergize solenoid 46 and thus release brake 44 and permit the take-up reel 6 to take up any slack in 26. S4 has the interlock switch 108 in series with it, this will deenergize brake 44 while the machine is being threaded. The interlock switch is closed by the closing of the mechanism cover 106.

As soon as the first picture or sound to be repeated appears between guide rollers 32 and 34, S4 is released to the normally closed position and brake 44 is energized as soon as cover 106 is closed. The loop forming mechanism 26 will now take up the slack of the tape or film which is fed in to it by the capstan mechanism.

It should be noted that the solenoid 94 is deenergized and the latch 82 associated with table 16 is in engagement with abutment 80, thus table 16 is prevented from withdrawing any tape or film from the supply reel 4. RY2 is deenergized by the opening of S2 but the idler 40 will be held in engagement with the capstan through RY1.

At the end of the sentence or phrase of which repetition is desired, S3, the repeat switch, is opened. This will immediately deenergize RY1. The idler 40 will be withdrawn from engagement with the capstan and the loop forming mechanism 16 will take up all of the slack accumulated in 26 because it has the stronger spring motor. When all of this slack had been taken up, S2 will be operated and RY2 will again be energized. Brake 44 has been kept energized by S3B. The operation of RY2 will engage the idler 40 and tape will once more be drawn past the heads and accumulated on 26. RY2 will remain energized through S1 and RY2 until all of the slack on 16 has been taken up and switch 78 operated by projection 76. At this time RY2 will drop out and the cycle will repeat.

When sufficient repetition of the sentence or phrase has been experience, S3 is manually returned to the position shown in FIG. 8. The loop forming mechanisms 16 and 26 may still have slack in one or the other, RY1 will not be energized. Brake 44 will be deenergized right away and take-up reel 6 will take up any remaining slack in 16 or 26. RY2 will then be energized through S2 and the idler 40 will engage the capstan and take up any slack from 16. When 16 is once again in the "straight through" position, switch 98 will operate and RY1 will be energized. This will release solenoid 94 and brake 90 and latch up table 16. At the same time, solenoid 46 and hence brake 44 will be energized, thus preventing any more slack from being taken up by reel 6 and permitting it instead to go into 26. The old information has thus been unloaded into reel 6 and the new information is being stored in 26 as it is being fed in. If any part of the incoming information is not wanted, it can be removed by manually opening S4, and the take-up reel 6 will remove it from the temporary storage.

If the capacity of table 26 is about to be exceeded owing to the non-operation of S3 by the operator, switch 62 will be closed by projection 60. This will energize RY3 and thus deenergize solenoid 46 and release brake 44. The take-up reel 6 will now take up all of the slack in 26 until switch S2 is operated. At this time RY3 will drop out and table 26 will once more accumulate slack. This cycle will continue until the repeat switch S3 is once more operated.

Figure 9:
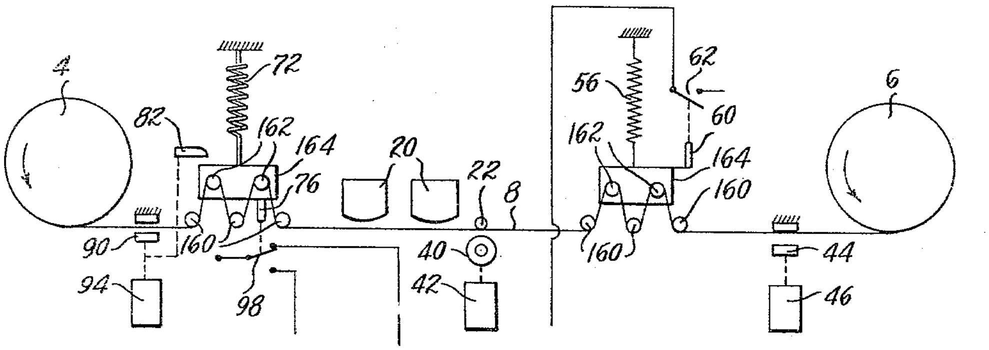
FIG. 9 is a diagrammatic view of a different embodiment of mechanism embodying the present invention.

FIG. 9 is a diagrammatic illustration of the manner in which the present invention may be incorporated in a mechanism of slightly different construction. In FIG. 9, all parts being in the same position and/or functioning in the same manner, are identified by the same reference numerals as employed in FIGS. 1 through 7. The principal difference between the modification of FIG. 9 and that previously described is that the loop forming mechanisms comprising tables 16 and 26 are replaced by a row of stationary rollers 160 and a pair of movable rollers 162 carried by travelling blocks 164 guided for movement in a direction transverse to the normal path of movement of the tape 8.

It will be obvious that movement of the rollers 162 upwardly will accumulate loops of tape thereon in exactly the same manner and under exactly the same conditions as described in connection with FIGS. 1 through 7.

While a limited number of specific embodiments of the invention have been shown and described herein, it is to be understood that the same are merely illustrative and that the invention defined by the following claims may be embodied in other forms of apparatus.

I claim:

1. In an instruction device having a supply reel and a take-up reel for an elongated filament having information recorded thereon, selectively operable driving means for said filament, and recording and playback means; the improvement comprising; means for guiding said filament from said supply reel past said recording and playback means, past said driving means, along a fixed path portion of substantial length tactually accessible to an operator, and then to said take-up reel; a pair of take-up devices, the first one being between said supply reel and said recording and playback means and the second one being between said driving means and said fixed path portion; means for operating said take-up devices to alternately take up and feed out portions of said filament whereby a predetermined length of said filament may be repeatedly played back while the length thereof along said fixed path portion remains stationary; and tactually readable information on said stationary length, corresponding to the information recorded on said predetermined length.

2. A device as defined in claim 1 including selectively operable clamp means for fixedly holding said filament at a first point between said first take-up device and said supply reel and at a second point between said second take-up device and said fixed path portion.

3. A device as defined in claim 1 wherein said means for operating said take-up devices comprise spring motors arranged to constantly but yieldably bias said devices to take up said filament; the spring motor for said first take-up device being stronger than the spring motor for said second device.

4. A device as defined in claim 3 including a latch for holding said first take-up device against operating to take up said filament; a clamp for fixedly holding said filament at a point between said first take-up device and said supply reel; and selectively operable means for setting said clamp and releasing said latch.

5. A device as defined in claim 1 wherein said filament comprises a flat tape; said guiding means being arranged to guide said tape to present one face thereof to said recording and playback means and to hold said one face against a supporting surface along said fixed path portion whereby the other face of said tape is tactually exposed to the operator along said fixed path portion.

6. A device as defined in claim 1 wherein each of said take-up devices comprises a rotary member having concentric circular rows of guide rollers thereon; at least one circular row of fixed guide rollers between said concentric rows; said guiding means being arranged to guide said filament substantially diametrically through said circular rows of guide rollers.

7. A device as defined in claim 6 wherein said instruction device comprises a housing having at least said guiding means and said rotary members on the upper surface thereof; a movable cover arranged to overlie at least said take-up devices but not said fixed path portion, said fixed guide rollers being carried by said cover and depending therefrom.

8. A take-up device for a magnetic tape or the like comprising: a rotary table having at least two concentric circular rows of circumferentially spaced guide rollers thereon, each row having at least four rollers; a stationary support having at least one circular row of at least four circumferentially spaced guide rollers thereon between said concentric rows on said table; and means for rotating said table in at least one direction.

9. A device as defined in claim 8 wherein said last-named means comprises a yieldable spring motor constantly urging said table to rotate in one direction.

10. A device as defined in claim 8 including selectively operable means for holding said table against rotation with said guide rollers so relatively positioned as to define an unobstructed path for tape extending substantially diametrically across said circular rows.

11. A device as defined in claim 8 wherein said stationary support comprises a movable cover overlying said table, said one row of rollers being mounted on said cover whereby said guide rollers on said cover may be removed therewith to render said table accessible for threading a tape thereacross.

References Cited by the Examiner

FOREIGN PATENTS

| | | |
|---|---|---|
| 808,430 | 11/36 | France. |
| 1,027,039 | 2/53 | France. |
| 22,908 | 11/00 | Switzerland. |

MERVIN STEIN, *Primary Examiner.*

JOSEPH P. STRIZAK, *Examiner.*